(No Model.)
B. T. BABBITT.
ART OF EXTRACTING GLYCERINE.
No. 275,976. Patented Apr. 17, 1883.
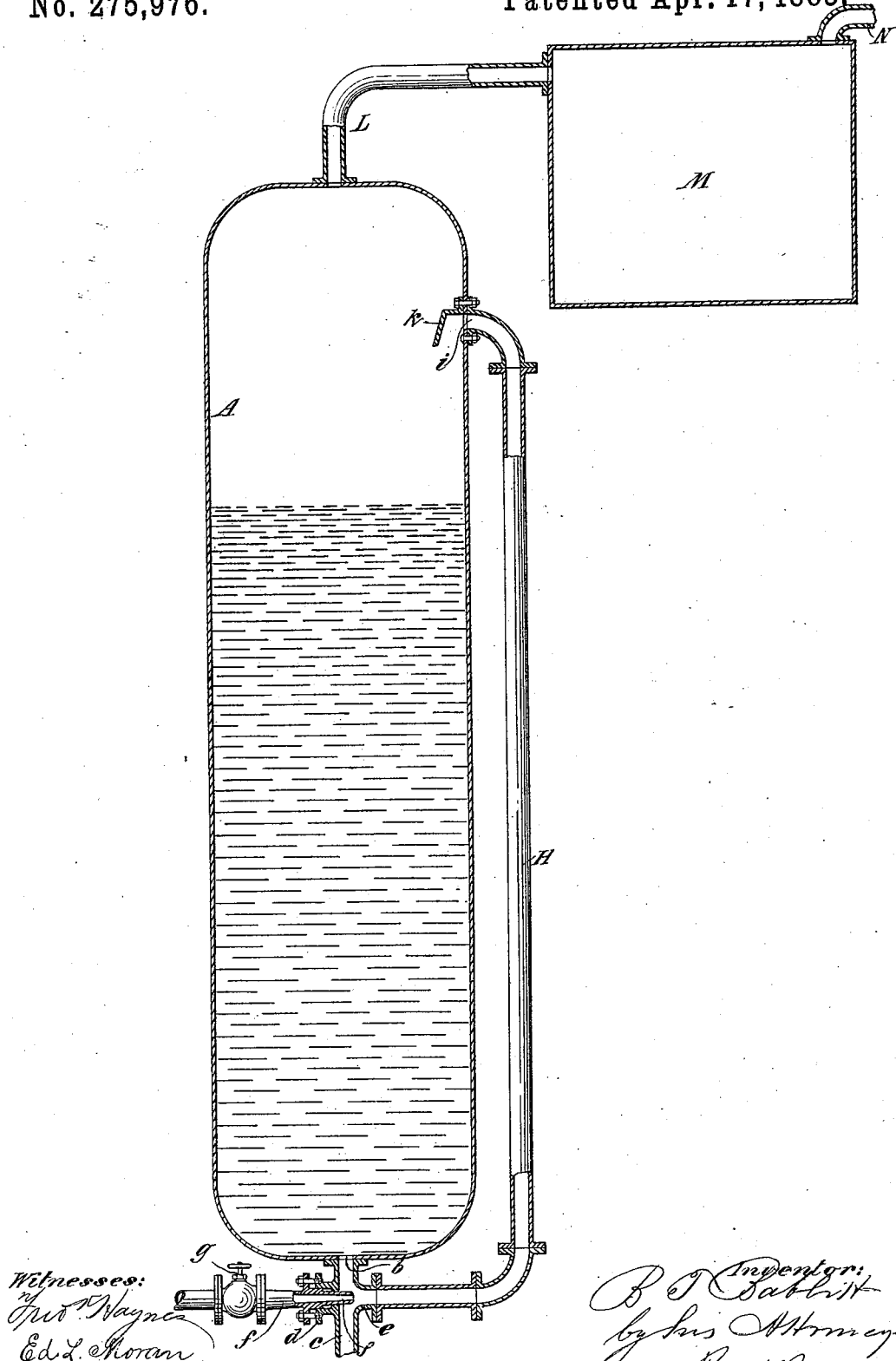

UNITED STATES PATENT OFFICE.

BENJAMIN T. BABBITT, OF NEW YORK, N. Y.

ART OF EXTRACTING GLYCERINE.

SPECIFICATION forming part of Letters Patent No. 275,976, dated April 17, 1883.

Application filed January 11, 1883. (No model.)

*To all whom it may concern:*

Be it known that I, BENJAMIN T. BABBITT, a citizen of the United States, residing in the city and county of New York, and State of New York, have invented certain new and useful Improvements in the Art of Extracting Glycerine, of which the following is a specification.

My invention consists in a novel improvement in the art of extracting glycerine from tallow or other fatty or oleaginous matter by atomizing or spraying the said matter by superheated steam, and causing it to be subjected to the action of such steam in its atomized state, and in an apparatus for accomplishing the above-named result, all as hereinafter more particularly described.

The accompanying drawing represents a vertical section of an apparatus for carrying out my invention.

A represents a high closed metallic chamber or cylinder, which may be about twenty-five (25) feet high and about six (6) feet in diameter. This chamber is provided with a small opening, $b$, in its bottom, through which the tallow and fat can pass out.

C is a pipe connected to the opening $b$, and having two branches, $d$ and $e$, to one of which—say $d$—is attached an injector or atomizer, $f$, through which superheated steam may pass. This atomizer is provided with a stop-cock, $g$.

To the branch $e$ of the pipe C is attached a long pipe or conduit, H, which extends almost the entire length of the chamber or cylinder A, and opens into the upper portion of the said chamber, at the point $i$, above the tallow contained therein. Over the opening $i$ is a distributing-plate, $k$. A pipe, L, connects the top of the cylinder A with the upper portion of a closed condensing-tank, M, and this tank is provided with an outlet or escape pipe, N.

The fat, tallow, or other oleaginous matter is introduced into the closed metallic chamber or cylinder A, preferably in a melted state and in any appropriate manner—as, for instance, through the pipe C, which is to be closed below the branches $d$ and $e$ when the apparatus is in operation. Superheated steam at a temperature of about six hundred degrees (600°) Fahrenheit is then admitted through the injector or atomizer $f$, meeting the tallow or fat descending through the opening $b$ and atomizing the same. The atomized fat or tallow is then carried by the superheated steam into the long pipe H, being subjected in its atomized and finely-divided state to the action of the superheated steam, where it is decomposed and the glycerine separated. The height of the pipe H allows the atomized fat to be for so considerable a time exposed to the action of the superheated steam that a complete or nearly complete extraction of the glycerine takes place. The separated particles of glycerine and fatty matter or fatty acid will then be carried by the steam through the opening $i$, (which is above the surface of the tallow in the chamber,) and striking against the distributing-plate $k$ will be scattered and more completely separated, the fat remaining undecomposed, and fatty acid will fall into the mass of fat below, while the greater portion of the glycerine will be carried by the steam up through the pipe L into the condensing-tank M, where the glycerine, by reason of its greater density and higher degree of temperature at which it condenses, will fall, while the steam escapes through the pipe N. This separating action is continuously and repeatedly taking place until all the glycerine is extracted from the fat or tallow in the chamber A.

My process and apparatus have the following advantages: The tallow or fat does not require to be mixed with water, as the steam furnishes all the water that is necessary. There is no necessity of using steam at a high pressure, as it has been found that superheated steam at a comparatively low pressure will accomplish the desired result, and consequently the apparatus does not have to be made as strong as if saturated steam at a sufficiently high temperature were used.

In my Letters Patent No. 256,614, dated April 18, 1882, I have described a process of extracting glycerine from soap-lyes, which consists in atomizing or spraying the lyes by superheated steam.

My present invention is for the treatment of fatty or oleaginous matters, whether they are to be used for soap-making or not, and prior to such use.

My present invention is not covered by my former patent, and therefore I now make it the subject of a separate patent.

What I claim as my invention, and desire to secure by Letters Patent, is—

1. The improvement in the art of extracting glycerine from tallow or other fatty or oleaginous matter, consisting in atomizing or spraying the said matter by superheated steam, and causing it to be subjected to the action of such steam in its atomized state, substantially as described.

2. In an apparatus for extracting glycerine from tallow or other oleaginous or fatty matters, the combination of a tank or closed vessel, a pipe or conduit leading from the bottom or lower part to the upper part thereof, and a steam-jet or atomizer entering said pipe or conduit, and serving to produce a current of the fatty matter, in an atomized condition, upward through said pipe or conduit, wherein it is acted upon by the steam, and finally delivered into the upper part of said tank or vessel, substantially as and for the purpose described.

3. In an apparatus for extracting glycerine from tallow or other fatty or oleaginous matter, the combination of the closed tank A, atomizer $f$, pipes H and L, the distributing-plate $k$, condensing-tank M, and exit-pipe N, all substantially as shown and described.

B. T. BABBITT.

Witnesses:
FREDK. HAYNES,
ED. L. MORAN.